United States Patent
Kim et al.

(10) Patent No.: US 10,014,976 B2
(45) Date of Patent: Jul. 3, 2018

(54) METHOD AND APPARATUS FOR MEASURING MU-MIMO INTERFERENCE IN MOBILE COMMUNICATION SYSTEM

(71) Applicant: Samsung Electronics Co., Ltd., Gyeonggi-do (KR)

(72) Inventors: Youn Sun Kim, Gyeonggi-do (KR); Ju Ho Lee, Gyeonggi-do (KR); Hyo Jin Lee, Gyeonggi-do (KR); Yong Jun Kwak, Gyeonggi-do (KR); Young Bum Kim, Seoul (KR); Hyoung Ju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 14/328,612

(22) Filed: Jul. 10, 2014

(65) Prior Publication Data
US 2015/0016291 A1    Jan. 15, 2015

(30) Foreign Application Priority Data
Jul. 10, 2013    (KR) .................. 10-2013-0081180

(51) Int. Cl.
*H04L 1/00*    (2006.01)
*H04B 7/0413*    (2017.01)

(52) U.S. Cl.
CPC ......... *H04L 1/0027* (2013.01); *H04B 7/0413* (2013.01); *H04L 1/0026* (2013.01)

(58) Field of Classification Search
CPC ... H04L 1/0026; H04L 5/0037; H04L 5/0048; H04L 5/0062; H04L 5/0073; H04L 25/0226
See application file for complete search history.

(56) References Cited

U.S. PATENT DOCUMENTS

| | | | |
|---|---|---|---|
| 8,787,219 B2 | 7/2014 | Feuersanger et al. | |
| 2011/0211504 A1 | 9/2011 | Feuersanger et al. | |
| 2012/0164950 A1* | 6/2012 | Nentwig | H04W 28/18 455/63.1 |

(Continued)

FOREIGN PATENT DOCUMENTS

| | | |
|---|---|---|
| JP | 2012090300 A | 5/2012 |
| KR | 20130039644 A | 4/2013 |

(Continued)

OTHER PUBLICATIONS

International Search Report dated Oct. 15, 2014 in connection with International Application No. PCT/KR2014/006188; 3 pages.

(Continued)

*Primary Examiner* — Michael Thier
*Assistant Examiner* — Prince A Mensah

(57) ABSTRACT

One or more embodiments discloses a method of measuring interference by an evolved NodeB and an eNB device. The method includes configuring one or more first type interference measurement resources in a User Equipment (UE). The method also includes transmitting signals for a plurality of UEs within a cell range of the eNB to the one or more first type interference measurement resources. The method also includes receiving channel status information generated in accordance with a signal received in the one or more first type interference measurement resources.

14 Claims, 14 Drawing Sheets

(56) References Cited

U.S. PATENT DOCUMENTS

| | | | |
|---|---|---|---|
| 2013/0102304 A1 | 4/2013 | Lee et al. | |
| 2013/0208604 A1* | 8/2013 | Lee | H04L 25/0226 370/252 |
| 2013/0215785 A1 | 8/2013 | Jung et al. | |
| 2013/0229938 A1 | 9/2013 | Jung et al. | |
| 2013/0242778 A1* | 9/2013 | Geirhofer | H04L 1/0026 370/252 |
| 2014/0036706 A1* | 2/2014 | Mondal | H04W 24/08 370/252 |
| 2014/0078919 A1* | 3/2014 | Hammarwall | H04L 5/0057 370/252 |
| 2014/0086082 A1 | 3/2014 | Kim et al. | |
| 2014/0204770 A1* | 7/2014 | Mondal | H04W 24/00 370/252 |

FOREIGN PATENT DOCUMENTS

| | | | | |
|---|---|---|---|---|
| KR | 20140039905 A | | 4/2014 | |
| WO | WO 2011/105726 | * | 9/2011 | H04J 11/00 |
| WO | WO 2012060602 A2 | | 5/2012 | |
| WO | WO 2013025558 A1 | | 2/2013 | |

OTHER PUBLICATIONS

HTC; "CSI-RS Based IMR in CoMP"; R1-122324; 3GPP TSG-RAN WG1 #690; Prague, Czech Republic; May 21-25, 2012; 2 pages.

\* cited by examiner

METHOD AND APPARATUS FOR MEASURING MU-MIMO INTERFERENCE IN MOBILE COMMUNICATION SYSTEM

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2013-0081180, filed on Jul. 10, 2013, which is hereby incorporated by reference for all purposes as if fully set forth herein.

TECHNICAL FIELD

The present disclosure relates generally to a method and an apparatus for measuring interference, and more particularly to a method and an apparatus for measuring interference in a mobile communication system in which a Multiple Input Multiple Output (MIMO) transmission is performed using a plurality of transmission antennas of an evolved NodeB (eNB).

BACKGROUND

From the early stages of providing voice-oriented services, mobile communication systems have evolved into high-speed, high-quality wireless packet data communication systems that provide data and multimedia services. Recently, various mobile communication standards such as High Speed Downlink Packet Access (HSDPA), High Speed Uplink Packet Access (HSUPA), Long Term Evolution (LTE), LTE-Advanced (LTE-A) of 3GPP, High Rate Packet Data (HRPD) of 3GPP2, and IEEE 802.16 have been developed to support high-speed, high-quality wireless packet data transmission services. In particular, an LTE system, which is a system developed to efficiently support high-speed wireless packet data transmission, maximizes wireless system capacity by using various radio access technologies. The LTE-A system, which is an advanced wireless system of the LTE system, has enhanced data transmission capability compared to the LTE system.

In general, LTE refers to a base station and user equipment corresponding to Release 8 or 9 of the 3GPP standard organization, and LTE-A refers to a base station and user equipment corresponding to Release 10 of the 3GPP standard organization. The 3GPP standard organization has standardized the LTE-A system and is now discussing the standard for the subsequent Release with improved capability based on the standardized LTE-A system.

The existing 3rd generation and 4th generation wireless packet data communication systems such as HSDPA, HSUPA, HRPD, and LTE/LTE-A employ an Adaptive Modulation and Coding (AMC) scheme, a channel-sensitive scheduling scheme, and the like to improve transmission efficiency. By using the AMC scheme, a transmitter can control the amount of transmitted data according to a channel state. That is, when the channel state is poor, the transmitter reduces the amount of transmitted data to adjust the reception error rate to a desired level. When the channel state is good, the transmitter increases the amount of transmitted data to adjust the reception error rate to the desired level and to efficiently transmit a large volume of information.

With the use of a channel-sensitive scheduling-based resource management method, the transmitter selectively provides a service to a user having a good channel state among a plurality of users, thus increasing the system capacity compared to the method of assigning a channel to one user and providing a service to the user with the assigned channel. This capacity increase is referred to as a multi-user diversity gain. That is, in the AMC method and the channel-sensitive scheduling method, partial channel state information is fed back from a receiver and a proper AMC scheme is applied at the time determined to be most efficient.

When the AMC method is used together with a Multiple Input Multiple Output (MIMO) transmission method, the AMC method may also include a function of determining the number or ranks of spatial layers of a transmitted signal. In this embodiment, in determining an optimal data rate, the AMC method also considers the number of layers to which data will be transmitted through MIMO as well as an encoding rate and a modulation method.

Research on switching Code Division Multiple Access (CDMA) corresponding to a multiple access method recently used in 2nd generation and 3rd generation mobile communication systems to Orthogonal Frequency Division Multiple Access (OFDMA) in a next generation system is being actively progressed. 3GPP and 3GPP2 starts progressing standardization for an evolved system using OFDMA. It is expected that the OFDMA scheme will have a larger capacity increase compared to the CDMA scheme. One of several causes which result in the capacity increase in the OFDMA scheme is that frequency domain scheduling can be performed. In the same manner as the channel-sensitive scheduling scheme in which a capacity gain is achieved according to the time-varying characteristic of a channel, it is possible to achieve a larger capacity gain by using the frequency-varying characteristic of a channel.

FIG. 1 illustrates time and frequency resources in an LTE/LTE-A system.

In FIG. 1, a radio resource which an evolved NodeB (eNB) transmits to a User Equipment (UE) is divided in the unit of Resource Blocks (RBs) on a frequency axis and in the unit of subframes on a time axis. In general, the RB consists of twelve subcarriers and occupies bands of 180 kHz in the LTE/LTE-A system. In contrast, one subframe generally consists of fourteen OFDM symbol intervals and occupies a time interval of 1 millisecond in the LTE/LTE-A system. The LTE/LTE-A system may allocate resources in the unit of subframes on the time axis and in the unit of RBs on the frequency axis in performing scheduling.

FIG. 2 illustrates radio resources of one subframe and one RB corresponding to a minimum unit which can be scheduled to the downlink in the LTE/LTE-A system.

The radio resource illustrated in FIG. 2 consists of one subframe on a time axis and one RB on a frequency axis. The radio resource consists of twelve subcarriers in a frequency domain and fourteen OFDM symbols in a time domain, and thus has a total of 168 inherent frequency and time locations. In the LTE/LTE-A system, each unique frequency-time location of FIG. 2 is referred to as a Resource Element (RE).

The following several different types of signals may be transmitted to the radio resources illustrated in FIG. 2.

A Cell specific Reference Signal (CRS) is a reference signal transmitted for all UEs included in one cell.

A DeModulation Reference Signal (DMRS) is a reference signal transmitted for a specific UE and is used for performing channel estimation to reconstruct information carried on a Physical Downlink Shared CHannel (PDSCH). One DMRS port applies the same precoding as that of a PDSCH layer connected to the DMRS port to perform transmission.

A UE which desires to receive a specific layer of a downlink data channel (PDSCH) may receive a DMRS port connected to a corresponding layer to perform channel estimation and then reconstructs information carried on the corresponding layer using the channel estimation.

The PDSCH is used when the eNB transmits traffic to the UE through a data channel transmitted to the downlink and is transmitted using an RE to which the RS is not transmitted in a data region of FIG. 2.

A Channel Status Information Reference Signal (CSI-RS) is a reference signal transmitted for UEs included in one cell and is used for measuring a channel status. A plurality of CSI-RSs may be transmitted to one cell.

A Zero Power CSI-RS (ZP-CSI-RS) means that an actual signal is not transmitted to a position to which the CSI-RS is transmitted.

An Interference Measurement Resource (IMR) corresponds to a position to which the CSI-RS is transmitted. In FIG. 2, one or more of A, B, C, D, E, F, G, H, I, and J may be configured as the IMRs. The UE performs an interference measurement based on the assumption that all signals received in REs, which are configured as IMRs, are interference.

Other control channels (PHICH, PCFICH, and PDCCH) provide control information required when the UE receives the PDSCH or transmit ACK/NACK for operating HARQ with respect to data transmission of the uplink.

In addition to the above signals, the ZP-CSI-RS may be configured such that CSI-RSs transmitted by different eNBs can be received by UEs of the corresponding cell without any interference in the LTE-A system. The ZP-CSI-RS (muting) may be applied in a position where the CSI-RS can be transmitted and the UE generally hops the corresponding radio resource and receives a traffic signal. In the LTE-A system, the ZP-CSI-RS (muting) is also called muting. This is because the characteristics of ZP-CSI-RS demand that it be applied to a position of the CSI-RS and, therefore, transmission power is not transmitted.

In FIG. 2, the CSI-RS may be transmitted using some of positions indicated by "A", "B", "C", "D", "E", "F", "G", "H", "I", and "J" based on the number of antennas through which the CSI-RSs are transmitted. Further, the ZP-CSI-RS (muting) may be applied to some of the positions marked by "A", "B", "C", "D", "E", "F", "G", "H", "I", and "J". Particularly, the CSI-RS may be transmitted to two, four, or eight REs according to the number of antenna ports transmitting the CSI-RSs. When the number of antenna ports is two, the CSI-RSs are transmitted to the half of a particular pattern. When the number of antenna parts is four, the CSI-RSs are transmitted to the entirety of the particular pattern. When the number of antenna ports is eight, the CSI-RSs are transmitted using two patterns. In contrast, the ZP-CIS-RS (muting) is always made in the unit of one pattern. That is, the ZP-CSI-RS (muting) may be applied to a plurality of patterns, but cannot be applied to only a part of one pattern when the ZP-CSI-RS does not overlap the CSI-RS. However, only when the CSI-RS and the ZP-CSI-RS (muting) overlap each other can the ZP-CSI-RS (muting) be applied to only part of one pattern.

"A", "B", "C", "D", "E", "F", "G", "H", "I", and "J" of FIG. 2 may be configured as IMRs. When the IMR is configured to a particular UE, the corresponding UE assumes signals received in Resource Elements (REs) included in the configured IMR as interference signals. The IMR is used for measuring strength of interference by the UE. That is, the UE determines strength of interference by measuring strength of signals received in REs included in the IMR configured for the UE itself.

Meanwhile, in a mobile communication system supporting FD-MIMO, the UE is required to measure interference from multiple users within the same eNB as well as interference from adjacent eNBs in order to improve the network reliability.

SUMMARY

To address the above-discussed deficiencies, it is a primary object to provide a method and an apparatus for measuring interference in an FD-MIMO system. Embodiments of the present disclosure provide a method and an apparatus for measuring interference in a mobile communication system in which MIMO transmission is performed using a plurality of transmission antennas of the eNB.

One or more embodiments of the present disclosure provide a method of measuring interference by an evolved NodeB (eNB) performing Multiple Input Multiple Output (MIMO) transmission. The method includes configuring one or more first type interference measurement resources in a User Equipment (UE). The method also includes transmitting signals for a plurality of UEs within a cell range of the eNB to the one or more first type interference measurement resources. The method also includes receiving channel status information generated in accordance with a signal received in the one or more first type interference measurement resources.

One or more embodiments of the present disclosure provide an evolved NodeB (eNB) performing Multiple Input Multiple Output (MIMO) transmission. The eNB includes a transmitter for transmitting data to a User Equipment (UE). The eNB also includes a receiver for receiving data from the UE. The eNB also includes a controller for making a control to configure one or more first type interference measurement resources in the UE, transmit signals for a plurality of UEs within a cell range of the eNB to the one or more first type interference measurement resources, and receive channel status information generated in accordance with a signal received in the first type interference measurement resource from the UE.

One or more embodiments of the present disclosure provide a method of measuring interference by a User Equipment (UE). The method includes receiving configurations of one or more first type interference measurement resources from an evolved NodeB (eNB) performing Multiple Input Multiple Output (MIMO) transmission and receiving signals for a plurality of UEs within a cell range of the eNB in at least one of the one or more first type interference measurement resources. The method also includes measuring first interference generated from a signal which the eNB transmits for remaining UEs except for the UE among the plurality of UEs in accordance with the signals for the plurality of UEs. The method also includes transmitting channel status information generated in accordance with measured interference information.

One or more embodiments of the present disclosure provide a User Equipment (UE). The UE includes a receiver for receiving data from an evolved NodeB (eNB) performing Multiple Input Multiple Output (MIMO) transmission. The UE also includes a transmitter for transmitting data to the eNB. The UE also includes a controller for making a control to receive one or more first type interference measurement resources from the eNB, receive signals for a plurality of UEs within a cell range of the eNB in the one or more first type interference measurement resources, measure first interference generated from a signal which the eNB transmits to remaining UEs except for the UE among the plurality of UEs, and transmit channel status information generated in accordance with measured interference information.

According to embodiments of the present disclosure, it is possible to measure MU-MIMO interference in an FD-MIMO system.

According to embodiments of the present disclosure, the UE can consider MU-MIMO interference in a process of generating channel status information. Accordingly, a mobile communication system supporting FD-MIMO can transmit MU-MIMO signals to the significantly larger number of UEs compared to a conventional LTE system.

Further, according to embodiments of the present disclosure, the UE can measure interference from adjacent eNBs as well as the MIMO interference of the same eNB.

In addition, according to embodiments of the present disclosure, the UE can measure the MIMO interference in the FD-MIMO system and reflect the measured interference in the generation of channel status information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 3 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. Hereinafter, embodiments of the present disclosure will be described in detail with reference to the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be determined based on the contents throughout the specification.

Further, the detailed description of embodiments of the present disclosure is made mainly based on a wireless communication system based on OFDM, particularly 3GPP EUTRA standard, but the subject matter of the present disclosure can be applied to other communication systems having a similar technical background and channel form after a little modification without departing from the scope of the present disclosure and the above can be determined by those skilled in the art.

Figure 1:
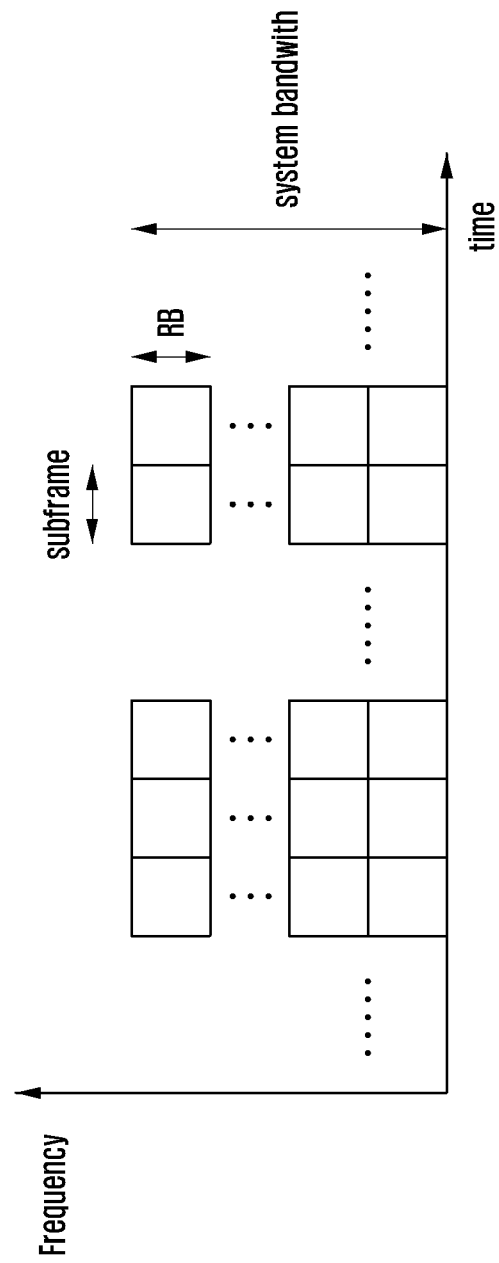
FIG. 1 illustrates time and frequency resources in an LTE/LTE-A system.
Figure 2:
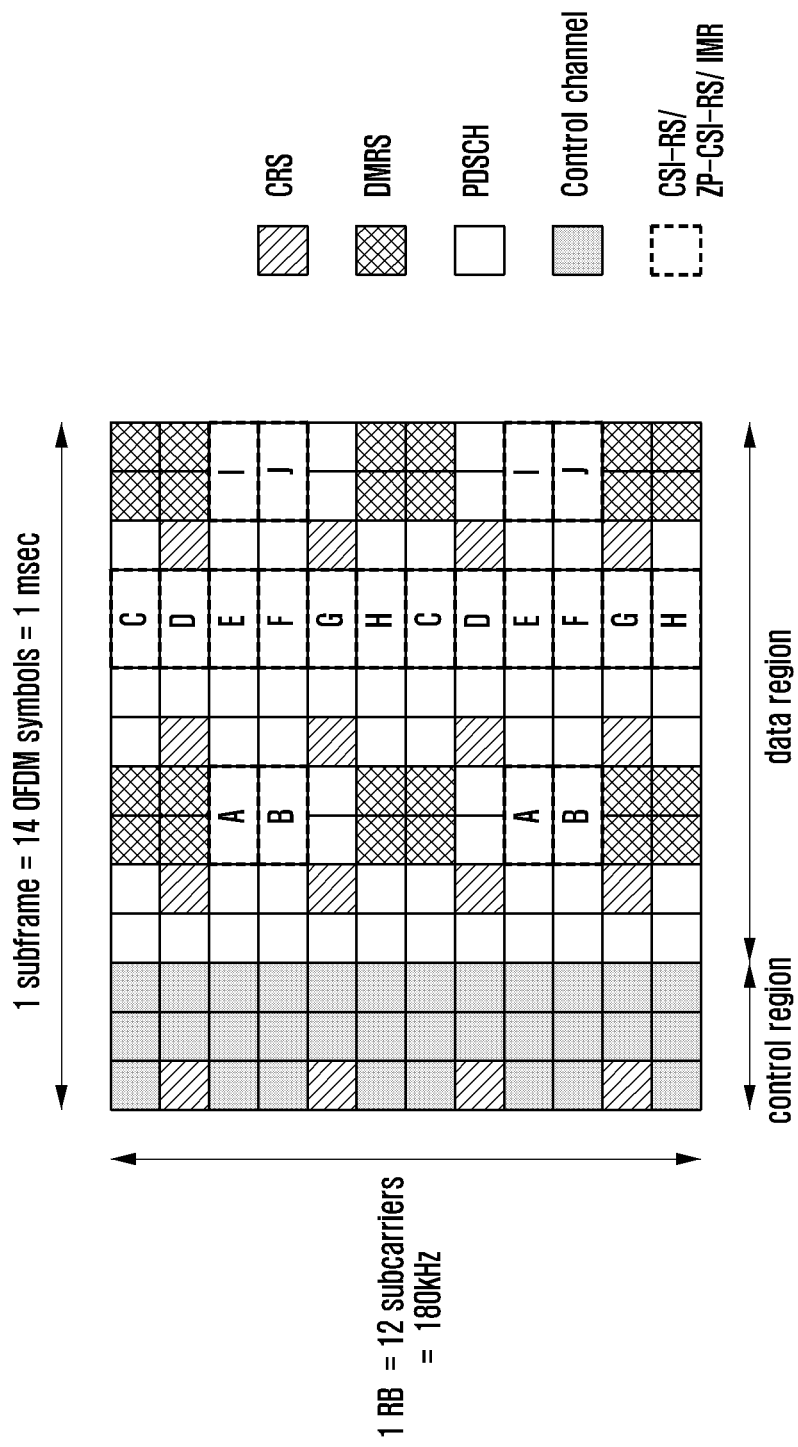
FIG. 2 illustrates radio resources of one subframe and one Resource Block (RB) corresponding to a minimum unit which can be scheduled to the downlink in the LTE/LTE-A system.
Figure 3:
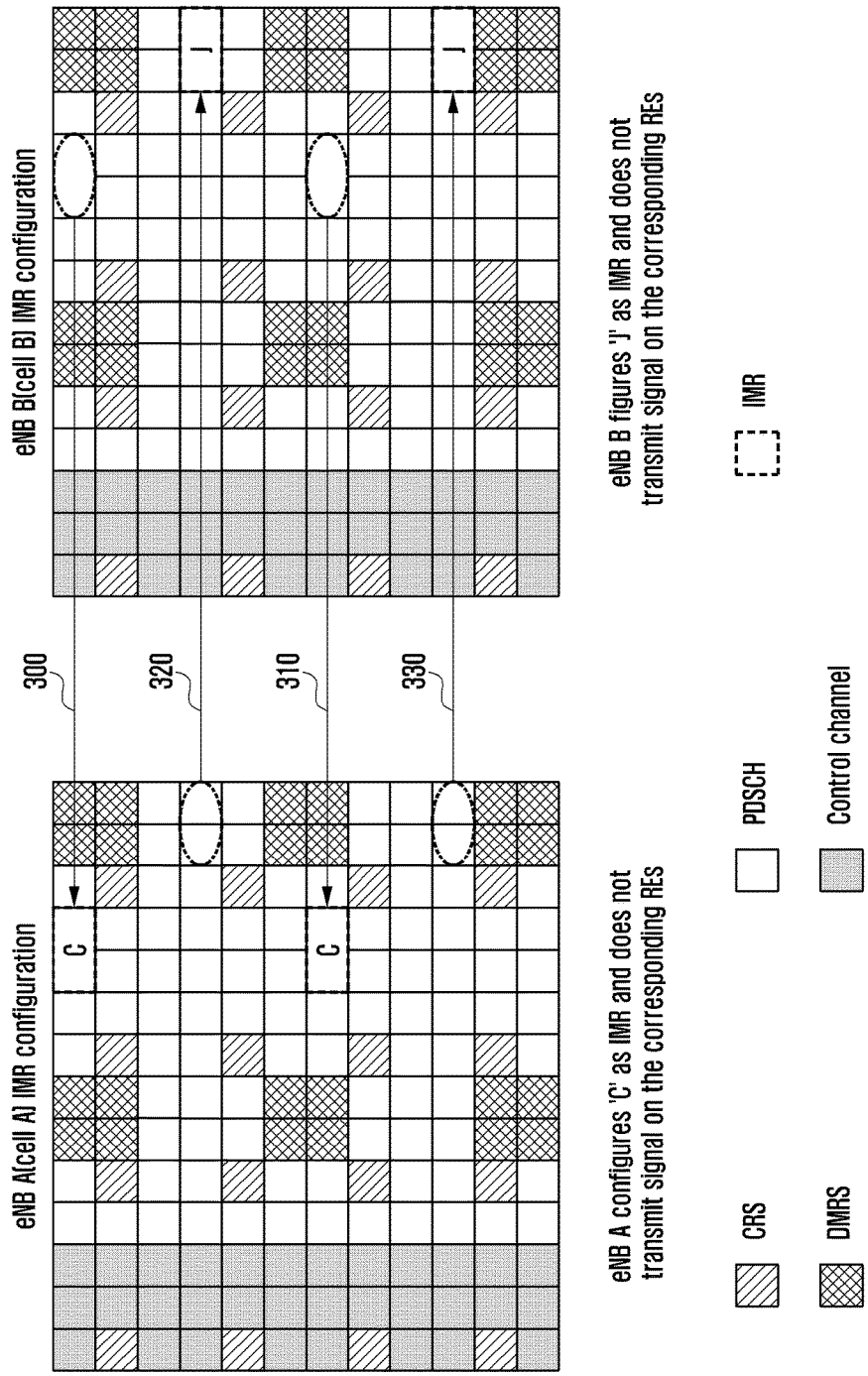
FIG. 3 illustrates an operation principle of an IMR.

FIG. 3 illustrates an operation principle of an IMR.

FIG. 3 illustrates signals transmitted by two eNBs to which the IMR is applied. In FIG. 3, an eNB A configures an IMR C in a UE located within a cell A. Further, an eNB B configures an IMR J in a UE located within a cell B. That is, UEs located within the cell A receive a PDSCH transmitted by the eNB A and thus are used to notify channel status information to the eNB A. In order to generate the channel status information, the UE is used to measure Es/(Io+No) of a channel (signal energy to interference and noise strength). The IMR aims at measuring the interference and noise strength by the UE. In FIG. 3, when the eNB A and the eNB B simultaneously perform transmission, they generate interference to each other. That is, a signal transmitted by the eNB B acts as interference to the UE which receives a signal from the eBN A. Further, a signal transmitted by the eNB A acts as interference to the UE which receives a signal from the eBN B.

In FIG. 3, the eNB A configures the IMR C in a UE located within the cell A such that the UE measures interference generated by the eNB B. Further, the eNB A does not transmit a signal in a position of the IMR C. As a result, the signals received by the UE in the IMR C are signals transmitted by the eNB B as indicated by reference numerals 300 and 310. That is, the UE may receive only a signal transmitted by the eNB B in the IMR C and determine strength of interference generated by the eNB B by measuring reception strength of the signal. Similarly, the eNB B configures the IMR J in a UE located within the cell B such that the UE measures interference generated by the eNB A. Further, the eNB B does not transmit a signal in a position of the IMR J.

When the IMR is used as illustrated in FIG. 3, strength of interference generated by a different eNB or a transmission position can be effectively measured. That is, in a multi-cell mobile communication system where a plurality of cells coexist or in a distributed antenna system, strength of interference generated by an adjacent cell or strength of interference generated by a transmission position can be effectively measured using the IMR. In contrast, strength of interference which cannot be effectively measured using the IMR is strength of MU-MIMO interference.

The LTE system supports MIMO transmission using a plurality of transmission/reception antennas. MIMO refers to spatial multiplexing of information according to instantaneous channels generated by a plurality of transmission/reception antennas. Since the MIMO transmission can spatially multiplex a plurality of data streams to one time and frequency resource, a data transmission rate can be increased several times as compared to the conventional non-MIMO transmission. LTE Release 11 supports MIMO transmission performed between a maximum of eight transmission antennas and a maximum of eight reception antennas. In this embodiment, a maximum of eight data streams can be spatially multiplexed and a maximum data transmission rate can be increased eight times as compared to non-MIMO.

In general, MIMO is divided into SU-MIMO in which a plurality of spatially multiplexed data streams are transmitted to one UE and MU-MIMO in which a plurality of spatially multiplexed data streams are simultaneously transmitted to a plurality of UEs. While a plurality of spatially multiplexed data streams are transmitted to one UE in SU-MIMO, a plurality of spatially multiplexed data streams are transmitted to a plurality of UEs in MU-MIMO. In MU-MIMO, an eNB transmits a plurality of data streams and each UE receives one or more data streams of the plurality of data streams transmitted by the eNB. MU-MIMO is particularly useful when the number of transmission antennas of the eNB is larger than the number of reception antennas of the UE. In SU-MIMO, the maximum number of data streams which can be spatially multiplexed is limited by min(NTx, NRx). NTx refers to the number of transmission antennas of the eNB and NRx refers to the number of reception antennas of the UE. In contrast, in MU-MIMO, a maximum number of data streams which can be spatially multiplexed is limited by min(NTx, NMS*NRX). NMS corresponds to the number of UEs.

In FIG. 3, although strength of interference generated by another eNB or a transmission position can be effectively measured by the IMR, strength of MIMO interference generated by the same eNB or within a transmission position cannot be effectively measured by the IMR.

In general, a signal received by the UE may be expressed by the following equation in a multi-cell mobile communication system.

$$\sum_i \sum_{j \in C_i^k} P_{i,j}^k \cdot h_{i,j}^k \cdot s_{i,j}^k \qquad (1)$$

In equation (1), $P_{ij}^k$ denotes transmission power which an i-th eNB or a transmission position allocates to a j-th UE in a k-th subframe. $h_{ij}^k$ denotes a result of a combination of a wireless channel between an i-th eNB or a transmission position and a j-th UE in a k-th subframe and antenna precoding for MIMO transmission. $s_{ij}^k$ denotes a transmission signal which an i-th eNB or a transmission position transmits to a j-th UE in a k-th subframe. Lastly, $C_i^k$ denotes a set of UEs to which an i-th eNB or a transmission position allocates downlink resources in a k-th subframe. When the number of UEs in $C_i^k$ for a k-th eNB or a transmission position is one, the corresponding eNB or transmission position transmits signals through SU-MIMO. When the number of UEs in $C_i^k$ is equal to or larger than two, the corresponding eNB or transmission position transmits signals through MU-MIMO. Equation (1) above is expressed as the following equation in a 0-th UE's side of a 0-th eNB.

$$P_{0,0}^k \cdot h_{0,0}^k \cdot s_{0,0}^k + \sum_{\substack{j \in C_0^k \\ j \neq 0}} P_{i,j}^0 \cdot h_{i,j}^0 \cdot s_{i,j}^0 + \sum_{i \neq 0} \sum_{j \in C_i^k} P_{i,j}^k \cdot h_{i,j}^k \cdot s_{i,j}^k \qquad (2)$$

In equation (2), a signal component which the 0-th eNB transmits to the 0-th UE is $P_{0,0}^k \cdot h_{0,0}^k \cdot s_{0,0}^k$ and an interference component generated by a different eNB is $$\sum_{i \neq 0} \sum_{j \in C_i^k} P_{i,j}^k \cdot h_{i,j}^k \cdot s_{i,j}^k.$$

The interference component $$\sum_{\substack{j \in C_0^k \\ j \neq 0}} P_{i,j}^0 \cdot h_{i,j}^0 \cdot s_{i,j}^0$$

generated by the different eNB may be measured using the IMR of FIG. 3. In contrast, $$\sum_{j \in C_i^k} P_{i,j}^k \cdot w_{i,j}^k \cdot s_{i,j}^k$$

which the 0-th eNB transmits to a different UE which is not the 0-th UE generates MU-MIMO interference to the 0-th UE having received data from the corresponding eNB. The MU-MIMO interference may be measured using the IMR.

A reason why the MU-MIMO interference cannot be measured using the IMR is that the eNB generating the MU-MIMO does not transmit a signal to the IMR. That is, in FIG. 3, on a driving principle of the IMR, when the eNB A transmits signals to a plurality of UEs through MU-MIMO, the eNB A does not transmit a signal to the IMR C. In this embodiment, a UE determining channel status information of the downlink of the eNB A can effectively measure interference generated by the eNB B in the IMR C, but cannot measure MU-MIMO interference generated by the eNB A.

When the UE determines channel status information, the UE obtains non-optimized system capability if the eNB performs MU-MIMO transmission to a plurality of UEs including the corresponding UE in a state where MU-MIMO interference cannot be accurately measured. A reason why the UE obtains the non-optimized system capability is that the eNB cannot effectively perform link adaptation. The link adaptation refers to allocation of a data rate according to a channel of the UE and is performed based on channel status information transmitted by the UE in a mobile communication system such as LTE. A problem is that the channel status information notified to the eNB is not suitable for the MU-MIMO transmission since the UE cannot measure MU-MIMO interference, and accordingly, it is difficult to perform effective link adaptation.

Influence of the MU-MIMO interference is not reflected to the channel status information and thus capability deterioration is particularly serious occurs in a mobile communication system such as massive MIMO or Full Dimension MIMO (FD-MIMO) in which MU-MIMO transmission to a plurality of UEs is simultaneously performed.

Figure 4:
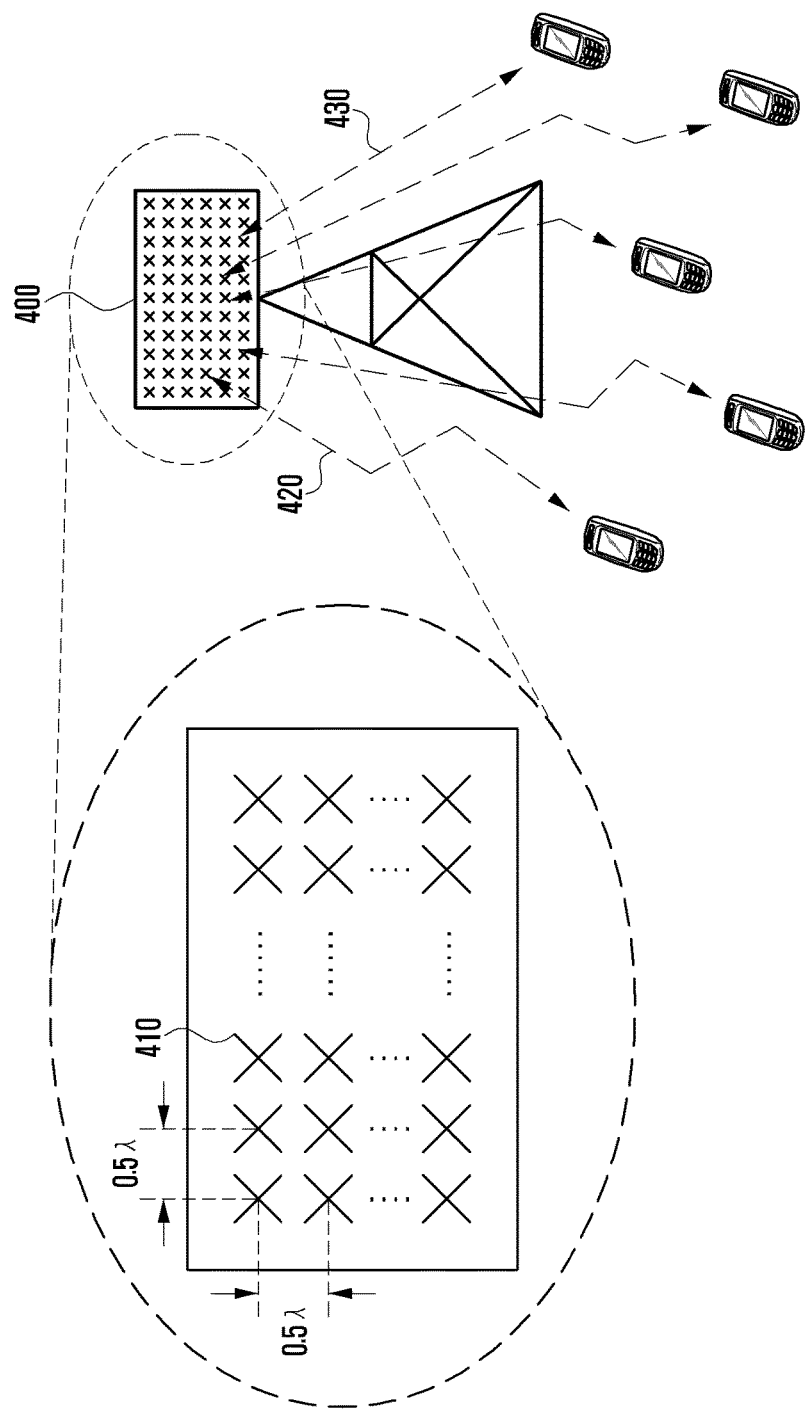
FIG. 4 illustrates an eNB supporting FD-MIMO.

Massive MIMO or FD-MIMO has dozens to hundreds of transmission antennas in the eNB. Further, in order to improve the system capability, the number of data streams which can be multiplexed could be significantly increased compared to the conventional LTE system. For this purpose, the mobile communication system supporting FD-MIMO could perform simultaneous transmission to a plurality of UEs by using MU-MIMO. FIG. 4 illustrates an eNB supporting FD-MIMO.

In FIG. 4, the eNB simultaneously transmits data to a plurality of UEs through a plurality of transmission antennas 400. The plurality of transmission antennas may include, for example, a 2D antenna array panel and respective antennas 410 that are arranged with distances corresponding to a function of a wavelength from each other. The eNB transmits data to a plurality of UEs using high order MU-MIMO through a set of the plurality of antennas 400. High order MU-MIMO means that the eNB allocates spatially separated transmission beams to a plurality of UEs through transmission antennas to transmit data. Since high order MU-MIMO is performed using the same time and frequency resource, it has an advantage of greatly improving the system capability.

Figure 5:
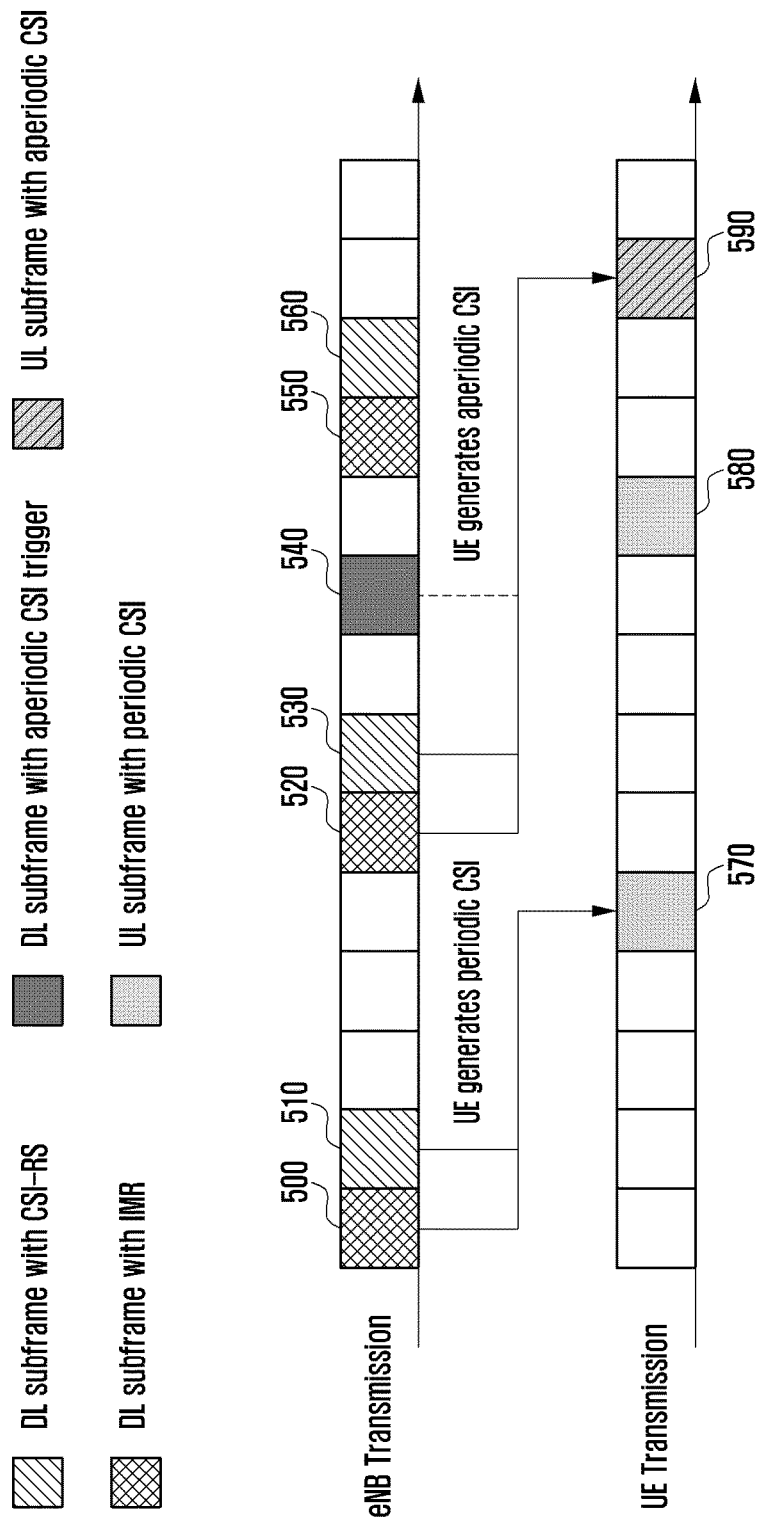
FIG. 5 illustrates, in a time domain, the downlink transmitted by an eNB and the uplink through which a UE having received the downlink transmits channel status information in order to measure the interference from adjacent eNBs.

FIG. 5 illustrates, in a time domain, the downlink transmitted by the eNB and the uplink through which the UE receiving the downlink transmits channel status information in order to measure interference of adjacent eNBs.

In FIG. 5, the eNB makes a configuration such that IMRs are periodically located in subframes 500, 520, and 550. That is, the eNB, using higher signaling, notifies the UE to allow measurement of interference in positions of particular IMRs of the corresponding subframes. The UE having received the notification measures interference in the corresponding IMRs and generates channel status information.

Further, the eNB transmits CSI-RSs in subframes 510, 530, and 560 and notifies the UE of the transmission using higher signaling. The UE, having received the notification, receives the CSI-RSs in the corresponding subframes and generates channel status information. In general, in order to generate the channel status information, the UE is used to measure Es/(No+Io). The UE measures noise strength (No) and interference strength (Io) by using the IMR and measures signal energy using the CSI-RS. In FIG. 5, the UE generates channel status information using the strength of noise and interference measured by the IMR and the signal energy measured by the CSI-RS. The channel status information contains periodic channel status information which the UE periodically reports and aperiodic channel status information which the UE reports only when there is an instruction of the eNB. The periodic channel status information is channel status information which the UE periodically reports according to a configured period through higher signaling. In contrast, the aperiodic channel status information is one time channel status information which the UE reports to the eNB only when there the eNB asks the UE for the CSI through a downlink physical layer control signal.

Channel status information which the UE reports to the eNB in subframes 570 and 580 of FIG. 5 corresponds to periodic channel status information. In generating channel status information in the subframes 570 and 580, the UE measures the signal energy and the strength of noise and interference by the CSI-RS and the IMR, respectively. Similarly, when generating aperiodic channel status information in a subframe 590, the UE measures the signal energy and the strength of noise and interference by the CSI-RS and the IMR, respectively. When the legacy method is applied, the MU-MIMO interference cannot be measured from the periodic channel status information and the aperiodic channel status information. Accordingly, when high order MU-MIMO such as an FD-MIMO system is used, deterioration in system capability deterioration may arise.

Figure 6:
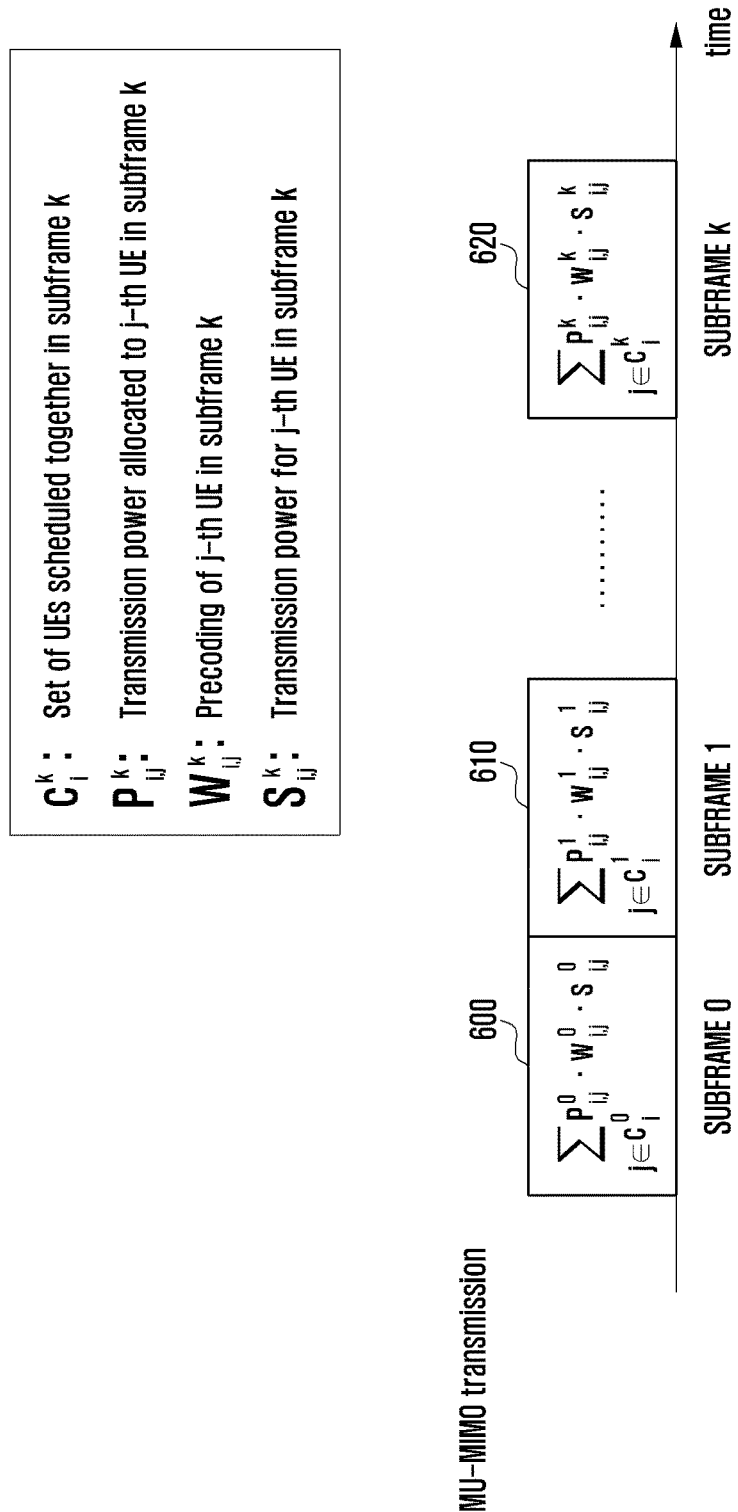
FIG. 6 illustrates MU-MIMO transmission performed by an eNB in each subframe.

The MU-MIMO interference may have different sizes and characteristics according to a set of a plurality of UEs to which the eNB performs MU-MIMO transmission. FIG. 6 illustrates MU-MIMO transmission performed by the eNB in each of subframes.

In FIG. 6, it may be noted that the eNB performs the MU-MIMO transmission to different sets of UEs according to the subframes. For example, in subframe 0, eNB i performs MU-MIMO transmission to UEs included in a set $C_i^0$. In contrast, in subframe 1, eNB i performs MU-MIMO transmission to UEs included in a set $C_i^1$. In subframe k, UEs included in $C_i^k$ are determined by a scheduler of the eNB and may be generally changed in every subframe. As described above, whenever the UE is changed, a signal transmitted to the UE and precoding applied to each UE are also changed. The precoding refers to efficiently transmitting signals through a plurality of antennas with appropriate weighting to the UE. In an example of the precoding, weights are applied to a plurality of antennas and beam is formed in a particular direction for the UE.

Figure 7:
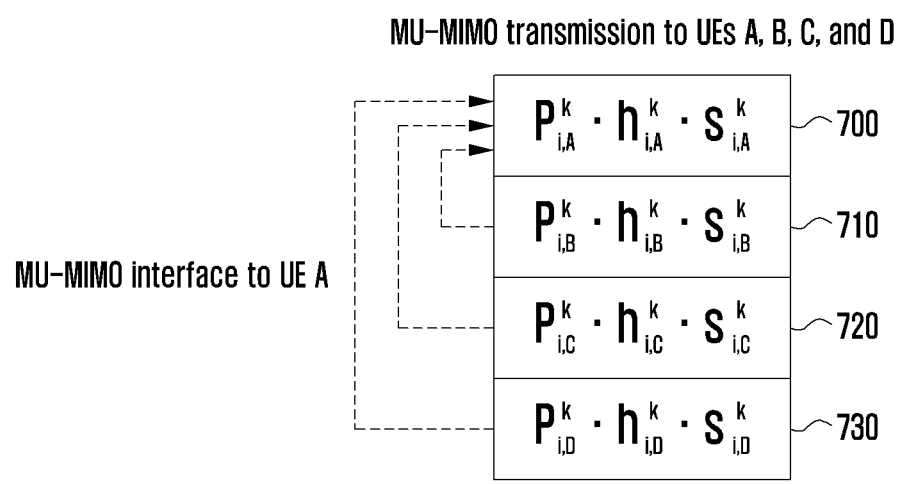
FIG. 7 illustrates MU-MIMO interference which UE A receives when eNB i performs MU-MIMO transmission to UEs A, B, C, and D in a k-th subframe.

FIG. 7 illustrates MU-MIMO interference which UE A receives when eNB i performs MU-MIMO transmission to UEs A, B, C, and D in a k-th subframe. UE A receives a signal 700 transmitted by the eNB.

Figure 8:
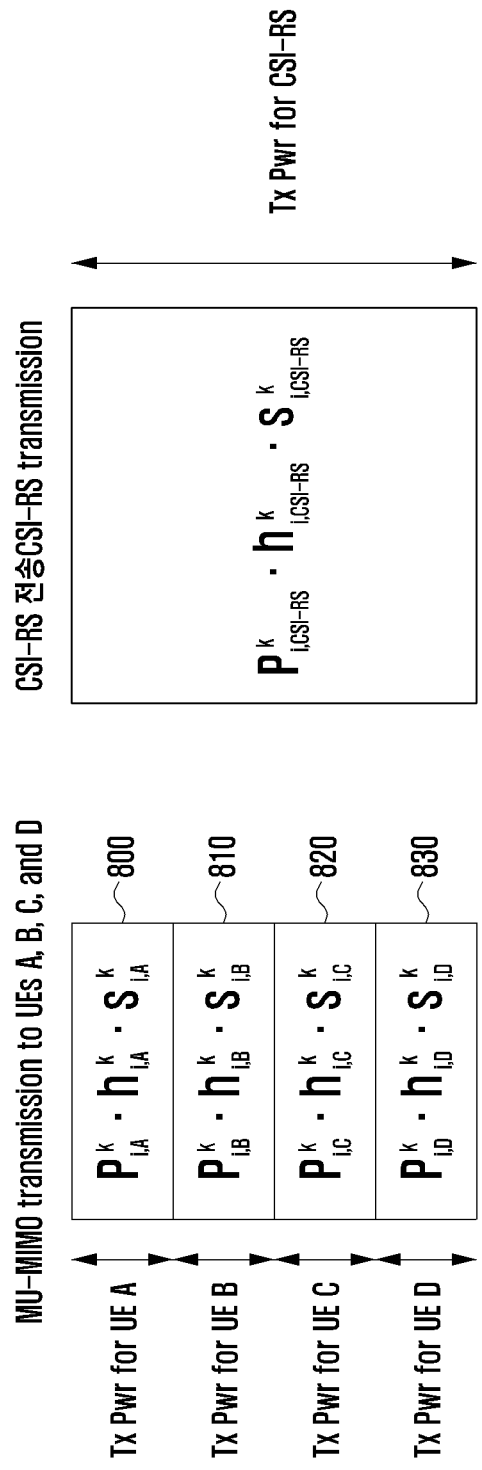
FIG. 8 illustrates transmission power which an eNB allocates to each UE when transmitting signals through MU-MIMO and transmission power of CSI-RSs which a UE measures to generate channel status information.

In FIG. 7, $P_{i,A}^k \cdot h_{i,A}^k \cdot s_{i,A}^k$ corresponds to a result received by UE A after a PDSCH signal transmitted by the eNB experiences precoding and passes through a wireless channel. In $P_{i,A}^k \cdot h_{i,A}^k \cdot s_{i,A}^k h_{i,A}^k$ indicates the influence of precoding and the wireless channel. In FIG. 8, UE A receives interference from signals 710, 720, and 730 which the eBN transmits to other UEs B, C, and D in a process of receiving a signal $P_{i,A}^k \cdot h_{i,A}^k \cdot s_{i,A}^k$ for UE A. When there is no accurate link adaptation considering strength of the interference, it is difficult to optimize capability of the mobile communication system which improves the system capability by using FD-MIMO and MU-MIMO.

When high order MU-MIMO such as FD-MIMO is applied, one more matter which could be considered is the number of simultaneously scheduled UEs. That is, when the eNB performs MU-MIMO transmission, a set of UEs and the number of UEs subject to the MU-MIMO transmission may be different in every subframe. That is, in FIG. 6, the number of UEs to which the eNB transmits MU-MIMO signals in a subframe 600 may be different from the number of UEs to which the eNB transmits MU-MIMO signals in a subframe 610.

In general, the eNB performs downlink transmission using limited transmission power. That is, when maximum transmission power of the eNB is Ptotal and MU-MIMO transmission to a plurality of UEs is performed, Ptotal could be distributed to the corresponding UEs. In order to effectively perform the distribution, the UE uses being informed of how much transmission power of the eNB is allocated to the UE in a process of generating channel status information. When the UE does not have such information, the UE cannot accurately determine a data transmission rate which the UE can support. As a result, the system capability deteriorates. FIG. 8 illustrates transmission power which the eNB allocates to each UE when transmitting signals through MU-MIMO and transmission power of a CSI-RS which the UE measures to generate channel status information. In FIG. 8, a PDSCH transmitted to the UE is transmitted using MU-MIMO. Accordingly, transmission power of the eNB could be distributed to a plurality of UEs. In contrast, in a situation of the CSI-RS which the UE measures to generate the channel status information, the transmission power of the eNB may not need to be shared with other UEs. In FIG. 8, when the UE generates the channel status information in a state where the UE does not know that transmission power allocated to the PDSCH is ¼ of transmission power allocated to the CSI-RS, the UE reports inaccurate channel status information to the eNB, thus deteriorating MU-MIMO capability.

In order to optimize the capability of the FD-MIMO system as illustrated in FIG. 4, the channel status information which the UE reports to the eNB could consider not only interference generated by another eNB but also MU-MIMO interference generated by an eNB transmitting the PDSCH. To this end, a method of accurately measuring the MU-MIMO interference in a process in which the UE generates the channel status information is used. Further, in the process of generating the channel status information, the UE could know in advance how much transmission power transmitted by the eNB is allocated to the UE itself.

Hereinafter, an MU-MIMO interference measuring method according to an embodiment of the present disclosure will be described.

The present disclosure proposes a new interference measuring method as a means for measuring MU-MIMO interference when the UE generates channel status information for the MU-MIMO. In the method proposed by the present disclosure, the eNB transmits signals for UEs which desire to transmit a PDSCH to IMRs using MU-MIMO. That is, when the eNB transmits signals to be transmitted to a plurality of UEs in a particular subframe to IMRs, the UE receives the signals and measures MU-MIMO interference.

Figure 9:
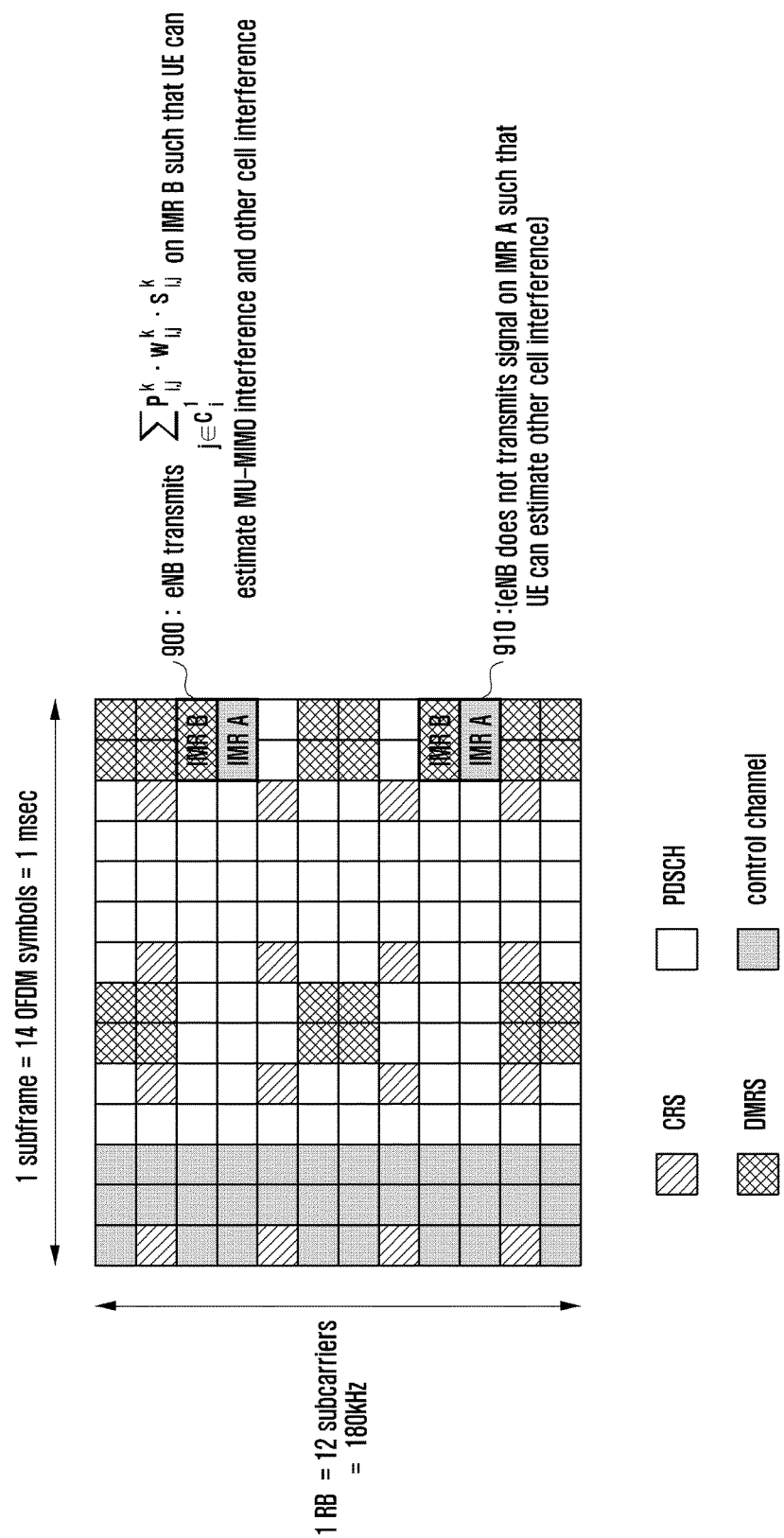
FIG. 9 illustrates transmission of MU-MIMO signals to IMRs by an eNB to measure MU-MIMO interference according to an embodiment of the present disclosure.

FIG. 9 illustrates that the eNB transmits MU-MIMO signals to IMRs for the MU-MIMO interference measuring method proposed by the present disclosure.

In FIG. 9, the eNB does not transmit a signal to IMR type A 910. Since the eNB does not transmit the signal to IMR type A, a signal which the UE can receive in IMR type A is only a signal transmitted by another eNB. That is, the UE can measure interference generated by an adjacent eNB by using IMR type A. In contrast, the eNB transmits signals to a plurality of UEs within a cell range of the same eNB in IMR type B 900. For example, it may be assumed that the eNB uses channel status information when MU-MIMO transmission to UE included a particular set $C_i^k$ is performed. In this embodiment, the eNB may transmit signals to the UEs included in $C_i^k$ in IMR type B. That is, the eNB may transmit a signal such as $$\sum_{j \in C_i^k} P_{i,j}^k \cdot w_{i,j}^k \cdot s_{i,j}^k$$

in IMR type B. In $$\sum_{j \in C_i^k} P_{i,j}^k \cdot w_{i,j}^k \cdot s_{i,j}^k,$$

$P_{i,j}^k$ denotes transmission power which an i-th eNB allocates to a j-th UE in a k-th subframe. $w_{i,j}^k$ denotes precoding which the i-th eNB applies for the j-th UE in the k-th subframe. Lastly, $s_{i,j}^k$ denotes a signal which the eNB transmits to allow the UE to measure interference and a different sequence is transmitted according to each UE. For example, $s_{i,j}^k$ may be an inherent scrambling sequence for each UE and the UE may be informed in advance by the eNB which scrambling sequence is applied to the UE itself or may determine the scrambling sequence using a prearranged method. The UE may receive $$\sum_{i \in C_i^k} P_{i,j}^k \cdot w_{i,j}^k \cdot s_{i,j}^k$$

in IMR type B and measure MU-MIMO interference. When a particular UE measures MU-MIMO interference by using the signals received in IMR type B, a process in which the UE recognizes that a signal for the UE exists in the received signals as well as a signal for another UE and removes the signal for the UE. When the UE does not remove the signal for the UE itself from the signals received in IMR type B, measured MU-MIMO interference may be distorted.

Accurate MU-MIMO interference can be measured only when the UE removes the signal for the UE itself from the signals received in IMR type B. To this end, the UE could first determine the signal for the UE and remove the signal from IMR type B. For example, an M-th UE could generate channel status information by processing a received signal like in the following equation.

$$\sum_{\substack{j \in C_i^k \\ j \neq M}} P_{i,j}^k \cdot w_{i,j}^k \cdot s_{i,j}^k = \sum_{j \in C_i^k} P_{i,j}^k \cdot w_{i,j}^k \cdot s_{i,j}^k - P_{i,M}^k \cdot w_{i,M}^k \cdot s_{i,M}^k \quad (3)$$

To this end, the M-th UE uses information on $P^k_{i,M}$, $w_{i,M}^k$, $s^k_{i,M}$. That is, the UE could estimate a received signal component for the UE in consideration of transmission power which the eNB allocates to the UE, the influence of precoding and a wireless channel, and a transmitted signal, and remove the received signal component from the signal received in IMR type B. In the present disclosure, $P^k_{i,M}$, $w_{i,M}^k$, $s^k_{i,M}$ which the UE assumes to remove the received signal components for the UE is named $\hat{P}_{i,M}^k$, $\hat{w}_{i,M}^k$, $\hat{s}_{i,M}^k$, respectively.

$\hat{s}_{i,M}^k$ of $\hat{P}_{i,M}^k$, $\hat{w}_{i,M}^k$, $\hat{s}_{i,M}^k$ uses a value prearranged between the UE and the eNB. For example, a different scrambling sequence is determined according to each UE. When the scrambling sequence is generated in the LTE/LTE-A system, a different value is generated by a sequence generator according to an initial state which is applied to the sequence generator. In general, the scrambling has an effect of randomizing a signal. Accordingly, when a combination of signals are transmitted to a plurality of UEs in IMR type B as described above, it is advantageous to transmit different scrambling sequences according to respective UEs. To this end, the present disclosure proposes to configure an initial state of each UE according to a Radio Network Temporary Identity (RNTI) value of the UE. The RNIT is a value which the eNB configures for each UE and is used in the LTE/LTE-A system for the purpose of distinguishing the UEs. As described above, when the sequence prearranged between the eNB and the UE is used, $\hat{s}_{i,M}^k$ is the same as $s_{i,M}^k$.

As mentioned above, $w_{i,M}^k$ is a result generated by applying precoding to the UE by an eNB having a plurality of antennas and passing a transmitted signal, to which the precoding has been applied, through a wireless channel. That is, $w_{i,M}^k$ contains influence of the precoding and the wireless channel. $\hat{w}_{i,M}^k$ of $\hat{P}_{i,M}^k$, $\hat{w}_{i,M}^k$, $\hat{s}_{i,M}^k$ is determined by the UE based on an assumption that a Precoding Matrix Indicator (PMI) which the UE reports to the eNB is applied in consideration of the influence. That is, the UE assumes that the eNB applies precoding according to the PMI which the UE reports to the eNB, receives a recent CSI-RS, combines the CSI-RS with a channel estimate obtained through channel estimation, and determines $\hat{w}_{i,M}^k$. In general, the channel estimate obtained through the channel estimation after reception of the CSI-RS is made before the UE measures the MU-MIMO, and thus may have some errors. However, the channel estimate may provide enough accuracy to generate channel status information by the UE.

$\hat{P}_{i,M}^k$, $\hat{w}_{i,M}^k$, $\hat{s}_{i,M}^k$ is information which the eNB notifies to the UE. $\hat{P}_{i,M}^k$ is used when the eNB transmits the CSI-RS to the UE using higher signaling or physical layer signaling. The eNB may notify of a ratio between the transmission power and transmission power used for transmitting a signal to one UE in IMR type B. That is, an i-th eNB may notify the UE of a ratio between transmission power $P_{i,M}^k$ which the eNB allocates an M-UE to measure interference and transmission power $P_{i,CSI-RS}^k$ for a CSI-RS which the corresponding eNB transmits. For example, the eNB may notify one of 1, 1/2, 1/4, 1/8, and 1/16 as the ratio between $P_{i,M}^k$ and $P_{i,CSI-RS}^k$. When the UE receives 1/8 as the ratio between $P_{i,M}^k$ and $P_{i,CSI-RS}^k$, the UE may assume that 1/8 of transmission power carried on the CSI-RS is carried on the signal of the UE transmitted in IMR type B. In the same way, the eNB notifies the UE of the number of UEs to which MU-MIMO transmission is performed and the UE may assume an inverse value of the number of UEs as the ratio between $P_{i,M}^k$ and $P_{i,CSI-RS}^k$.

Figure 10:
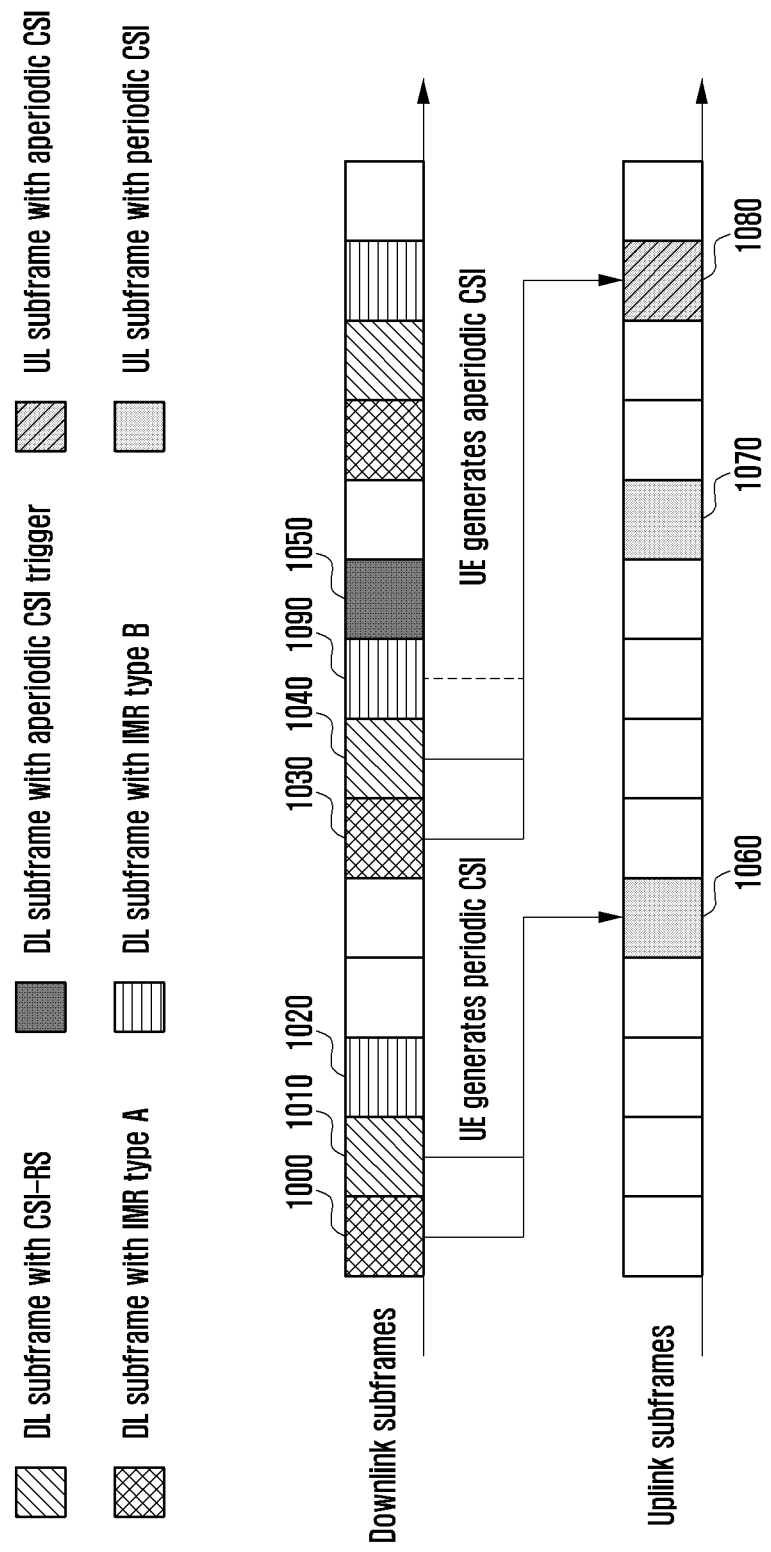
FIG. 10 illustrates, in a time domain, the downlink transmitted by an eNB and the uplink through which a UE having received the downlink transmits channel status information according to an embodiment of the present disclosure.

The method of measuring the MU-MIMO interference may be applied like in FIG. 10 when the UE generates the aperiodic channel status information.

In FIG. 10, the UE generates periodic and aperiodic channel status information and reports the generated information to the eNB. The periodic channel status information is generated by measuring interference generated by an adjacent eNB link in IMR type A of FIG. 9. That is, the UE may generate the periodic channel status information using the CSI-RS and a subframe with IMR type A 1000. As mentioned above, the UE may continuously generate the periodic channel status information through the same method unless the UE receives a separate configuration from the eNB and notifies the periodic channel status information to the eNB. In contrast, the aperiodic channel status information is generated when the UE receives an aperiodic CSI trigger as indicated by a reference numeral 1050. The UE receives the aperiodic CSI trigger 1050 and then may measure MU-MIMO interference in the most recent IMR type B 1090. The MU-MIMO interference measuring method described in FIG. 9 can be applied. One of information which the UE receives from the eNB together with the aperiodic CSI trigger in a subframe 1050 is a ratio between $\hat{P}_{i,M}^k$ and $P_{i,CSI-RS}^k$. That is, when making a request for the aperiodic channel status information considering MU-MIMO interference to the UE, the eNB may notify a ratio of $\hat{P}_{i,M}^k$ and $P_{i,CSI-RS}^k$ to the UE. The ratio of $\hat{P}_{i,M}^k$ and $P_{i,CSI-RS}^k$ is used when the UE measures the MU-MIMO interference as mentioned above.

In FIG. 10, the UE measures interference by using different IMRs in when the UE generates periodic channel status information and aperiodic channel status information. That is, when the UE generates the periodic channel status information, the UE may generate the channel status information in consideration of only interference generated by an adjacent eNB except for MU-MIMO interference by using IMR type A. Further, when the UE generates the aperiodic channel status information, the UE may measure the MU-MIMO interference by using IMR type B and then generate the channel status information by using the measured MU-MIMO interference.

As mentioned above, IMR type B may be used for measuring the MU-MIMO interference. Further, according to the selection of a network, the UE may measure both the MU-MIMO interference and interference of another eNB or measure only the MU-MIMO interference without measuring the interference of another eNB. The UE may measure both the MU-MIMO interference and the interference generated by another eNB in IMR type B. In this embodiment, another eNB may make a configuration such that a PDSCH is transmitted without a configuration of a zero power CSI-RS in a radio resource position of IMR type B. In contrast, when the UE does not measure the interference generated by another eNB while measuring the MU-MIMO interference in IMR type B, another eNB may enable the PDSCH to not be transmitted by configuring the zero power CSI-RS in the radio resource position of IMR type B. That is, when the UE desires to measure only the MU-MIMO interference of eNB 0 by using IMR type B in the network, adjacent eNBs of eNB 0 configure the zero power CSI-RS in the radio resource position of IMR type B, such that a signal transmitted by the corresponding eNB is not received in IMR type B. As a result, the UE receives only the MU-MIMO interference generated by eNB 0 in IMR type B. As described above, a situation where the signal of the adjacent signal is not received in IMR type B is advantageous when the UE removes a signal component for the UE from the signal received in IMR type B as expressed in equation (3). When the adjacent eNB does not generate interference, it is possible to perform more accurate signal processing.

As described above, when the adjacent eNBs configure the zero power CSI-RS in MIR type B and thus interference between eNBs is not received in IMR type B, the UE may further consider the interference between the eNBs in addition to the interference measured in IMR type B at the time when the UE generates aperiodic channel status information. In an embodiment of the present disclosure, in this embodiment, the UE measures the MU-MIMO interference in IMR type B and measures the interference between the eNBs in IMR type A, so as to generate channel status information considering a sum of the MU-MIMO interference and the interference between the eNBs. In FIG. 10, when the UE receives the aperiodic CSI trigger 1050, the UE may generate channel status information by using strength of interference corresponding to a sum of interference IA measured in most recent IMR type A 1040 and interference IB measured in most recent IMR type B 1090.

The interference IA measured in IMR type A 1040 and the interference IB measured in most recent IMR type B 1090 may be combined. For example, the interference IA and the interference IB may be combined at a one to one ratio. Further, in another example, the interference IA and the interference IB may be combined by applying a predetermined ratio a.

$$I_{total} = \alpha \cdot I_A + I_B \quad (4)$$

In equation (4), α is a fixed value defined in the LTE/LTE-A standard or a value which the eNB notifies or configures to the UE by using higher signaling or physical layer signaling. For example, when α is 0, the UE does not add the interference measured in IMR type A to the interference measured in IMR type B. When α is 1, the UE may combine the interference measured in IMR type B and the interference measured in IMR type A at a one to one ratio and generate channel status information based on the combination of the interference.

In the above description, the UE measuring the interference in IMR type B first removes the signal for the UE from the received signals and then measures the MU-MIMO interference using the remaining signals. In addition to such a method, a method in which the eNB does not transmit the signal of the UE measuring the interference by using IMR type B to a radio resource position of the corresponding IMR is possible. That is, when an M-th UE measures interference by using IMR type B, the eNB transmits $$\sum_{\substack{j \in C_i^k \\ j \neq M}} P_{i,j}^k \cdot w_{i,j}^k \cdot s_{i,j}^k$$

which does not include the signal of the M-th UE to a radio resource position of the corresponding IMR. In this embodiment, the UE determines all signals received in IMR type B as MU-MIMO interference without a separate signal removing process, calculates strength of the interference, and calculates channel status information. Further, in this embodiment, the UE may generate the channel status information by combining the interference measured in IMR type B and the interference measured in IMR type A as expressed in equation (4).

An advantage of the method in which the eNB does not transmit the signal of the UE measuring the interference by using IMR type B to the radio resource position of the corresponding IMR is that the UE is not used to remove the signal of the UE itself and thus signal processing is simple. However, a disadvantage of the method is that the corresponding eNB receives the PSDCH and respective UEs generating channel status information use individual IMR type Bs. That is, the eNB could allocate IMRs corresponding to the number of UEs receiving the PDSCH, and accordingly, excessive overheads may be generated in the downlink.

Although the technology proposed by the present disclosure has been described mainly based on the aperiodic channel status information, the technology proposed by the present disclosure may be applied to the periodic channel status information in the same way.

Figure 11:
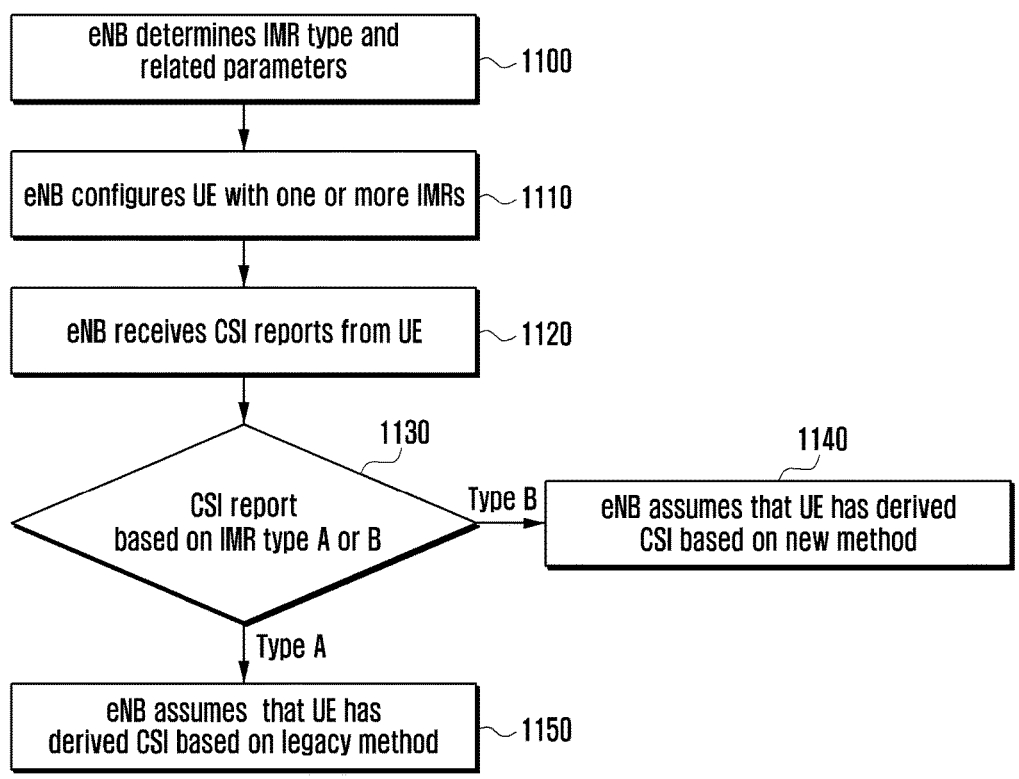
FIG. 11 illustrates a process in which an eNB configures a plurality of IMR types and receives channel status information from a UE based on the configured IMR types according to an embodiment of the present disclosure.

FIG. 11 illustrates a process in which the eNB configures a plurality of IMR types and receives channel status information from the UE based on the configured IMR types according to an embodiment of the present disclosure.

In operation 1100 of FIG. 11, the eNB may determine the IMR type to be configured in the UE. The eNB may configure only IMR type A or only IMR type B according to the UE. Further, the eNB may configure both IMR type A and IMR type B in a particular UE. The eNB, after having determined which IMR type will be configured, notifies the UE of the configured IMR type in operation 1110. That is, in operation 1110, the eNB may notify the UE of whether the corresponding IMR is IMR type A or IMR type B while configuring the IMR of the UE. Thereafter, the eNB may receive channel status information from the UE in operation 1120. The eNB may determine the IMR type based on which corresponding channel status information is generated while receiving a channel status transmitted by the UE in operation 1130. When the UE measures interference based on IMR type A, generates channel status information, and determines that the channel status information is transmitted in operation 1130, the eNB determines the channel status information transmitted by the UE as channel status information generated in consideration of only interference by an adjacent eNB in operation 1150. In contrast, when the UE measures interference based on IMR type B, generates channel status information, and determines that the channel status information is transmitted in operation 1130, the eNB determines the channel status information transmitted by the UE as channel status information generated in consideration of MU-MIMO interference also in operation 1140.

Figure 12:
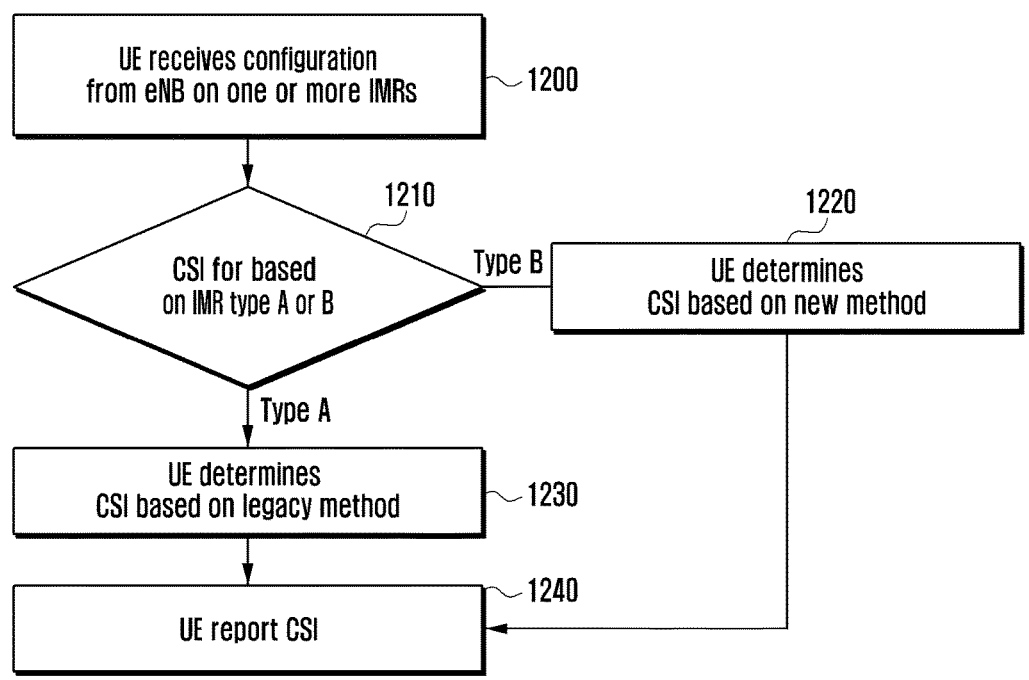
FIG. 12 illustrates a process in which a UE receives configurations of a plurality of IMR types from an eNB and generates and transmits channel status information based on the configurations according to an embodiment of the present disclosure.

FIG. 12 illustrates a process in which the UE receives configurations of a plurality of IMR types from the eNB and generates and transmits channel status information according to the configurations.

In operation 1200, the UE may receive configurations of one or more IMRs from the eNB. In operation 1200, the UE may receive information indicating whether the IMR configured in connection to the configurations of the one or more IMRs is IMR type A or IMR type B. When a plurality of IMRs is configured, the UE may be informed of the IMR type from the eNB with respect to each of the IMRs. In operation 1210, the UE may determine whether the channel status information to be generated uses an interference measurement using IMR type A or IMR type B. When the UE determines that the interference measurement using IMR type B is used in operation 1210, the UE measures MU-MIMO interference and interference generated by another eNB using the MU-MIMO interference measuring method proposed by the present disclosure and generates channel status information based on the measured interference in operation 1220. In contrast, when the UE determines that the interference measurement using IMR type A is used in operation 1210, the UE assumes a signal received in the IMR as interference by using a legacy method and generates channel status information based on the interference in operation 1230. The UE may report the generated channel status information to the eNB in operation 1240.

Figure 13:
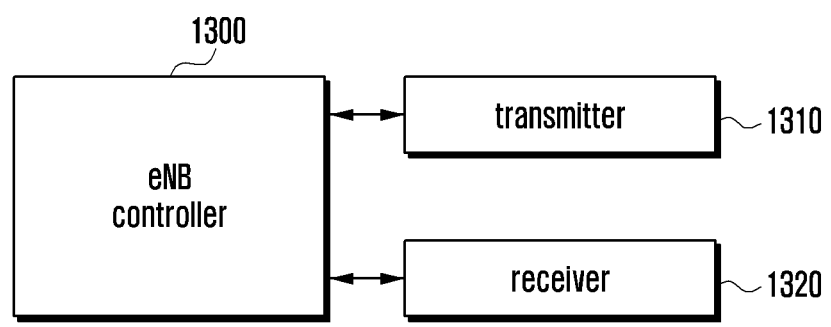
FIG. 13 illustrates a block diagram of an eNB device according to an embodiment of the present disclosure.

FIG. 13 illustrates a block diagram illustrating the eNB according to an embodiment of the present disclosure.

In FIG. 13, a controller 1300 may configure an IMR in the UE. Further, according to whether the configured IMR is IMR type A or IMR type B, the controller 1300 may either transmit a signal which can measure MU-MIMO interference or allocate no transmission power. The controller 1300 may notify the UE of an IMR-related configuration using a transmitter 1310. Further, when the controller 1300 configures IMR type B in the UE, the controller 1300 may transmit an MU-MIMO signal which the UE will measure to an IMR radio resource configured as IMR type B through the transmitter 1310. The eNB may receive channel status information which the UE measures and reports through a receiver 1320. The controller 1300 may determine the IMR type based on which received channel status information is generated and use the IMR type for radio resource management for the downlink of the eNB.

In an embodiment of the present disclosure, the controller 1300 may make a control to configure at least one IMR type B in the UE, transmit signals for a plurality of signals within a cell range of the eNB to at least one IMR type B, and receive channel status information generated in accordance with a signal received in IMR type B from the UE.

Further, the controller 1300 may make a control to transmit a ratio between transmission power allocated to the UE in which the IMR is configured and transmission power for the CSI-RS.

The controller 1300 may make a control to configure IMR type A and transmit no signal to IMR type A.

The controller 1300 may make a control to determine at least one IMR type to be configured in the UE and notify the UE in which the IMR is configured of the determined IMR type.

Figure 14:
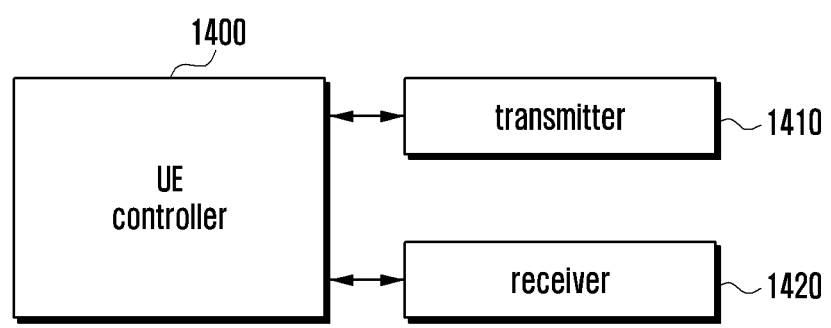
FIG. 14 illustrates a block diagram of a UE device according to an embodiment of the present disclosure.

FIG. 14 illustrates a block diagram illustrating the UE according to an embodiment of the present disclosure.

In FIG. 14, a controller 1400 may receive a configuration related to the IMR from the eNB through a receiver 1420. The UE may receive configurations of one or more IMRs. Further, with respect to each of the received IMRs, the UE may be informed of whether the corresponding IMR is IMR type A or IMR type B from the eNB. Thereafter, the UE may receive a signal for the downlink through the receiver 1420 and the controller 1400 may generate channel status information by using the received signal. The controller 1400 uses a different interference measuring method according to an IMR type and may generate channel status information on the interference measuring method. The generated channel status information may be notified to the eNB through the transmitter 1410.

In an embodiment of the present disclosure, the controller 1400 may make a control to receive a configuration of at least one IMR type B from the eNB, receive signals for a plurality of UEs within a cell range of the eNB in at least one IMR type B, measure first interference generated from signals which the eNB transmits for the remaining UEs except for the UE among the plurality of UEs, and transmit channel status information generated in accordance with the measured interference information.

Further, the controller 1400 may make a control to estimate a received signal component in consideration of transmission power allocated by the eNB, the influence of precoding and a wireless channel, and a transmitted signal, and measure the first interference by removing the estimated received signal component from the received signals for the plurality of UEs.

In addition, the controller 100 may make a control to receive a configuration of at least one IMR type A from the eNB, receive a signal from an adjacent eNB in IMR type A, and measure the signal received from the adjacent eNB as second interference.

The controller 1400 may make a control to measure the second interference by using an equation of $$\sum_{\substack{j \in C_i^k \\ j \neq M}} P_{i,j}^k \cdot w_{i,j}^k \cdot s_{i,j}^k = \sum_{j \in C_i^k} P_{i,j}^k \cdot w_{i,j}^k \cdot s_{i,j}^k - P_{i,M}^k \cdot w_{i,M}^k \cdot s_{i,M}^k$$

may be the signal for the plurality of UEs and $P_{i,M}^k \cdot w_{i,M}^k \cdot S_i$, $M^k$ may be the estimated received signal component.

Further, the controller 1400 may make a control to generate channel status information by using strength of interference corresponding to a sum of the first interference and the second interference like in the following equation.

$$I_{total} = \alpha \cdot I_A + I_B$$

In the above equation, IA denotes first interference, IB denotes second interference, and α denotes a fixed value defined in the LTE/LTE-A standard or a value which the eNB notifies or configures to the UE using higher signaling or physical layer signaling.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a base station performing multiple input multiple output (MIMO) transmission, the method comprising:

transmitting, to a plurality of terminals, a message configuring a first type interference measurement resource (IMR) for measuring interference between terminals within a coverage of the base station and a second type IMR for measuring interference from at least one neighbor base station;

transmitting, to the plurality of terminals, a signal based on the first type IMR and the second type IMR; and receiving, from a terminal among the plurality of terminals, channel status information (CSI) generated based on the signal, wherein the interference between the terminals within the coverage of the base station is measured by removing a signal component of the terminal itself from the transmitted signal using the first type IMR, and wherein the interference between the terminals is measured by using an equation of $$\sum_{\substack{j \in C_i^k \\ j \neq M}} P_{i,j}^k \cdot w_{i,j}^k \cdot s_{i,j}^k = \sum_{j \in C_i^k} P_{i,j}^k \cdot w_{i,j}^k \cdot s_{i,j}^k - P_{i,M}^k \cdot w_{i,M}^k \cdot s_{i,M}^k,$$

where $$\sum_{j \in C_i^k} P_{i,j}^k \cdot w_{i,j}^k \cdot s_{i,j}^k$$

is the signal for the plurality of terminals, $P_{i,j}^k$ is a transmission power which an i-th base station allocates to a j-th terminal in a k-th subframe, $w_{i,j}^k$ is a precoding which the i-th base station applies to the j-th terminal in the k-th subframe, $s_{i,j}^k$ is a signal which the base station transmits to allow a terminal to measure interference, $C_i^k$ is a set of terminals to which the i-th base station or a transmission position allocates downlink resources in the k-th subframe, and $P_{i,M}^k \cdot w_{i,M}^k \cdot s_{i,M}^k$ is the removed signal component.

2. The method of claim 1, wherein the base station is configured not to transmit the signal on the second type IMR to allow the terminal to measure the interference from the at least one neighbor base station.

3. The method of claim 1, wherein the CSI includes information on an interference from adjacent terminals within the coverage of the base station except for the terminal.

4. A base station performing multiple input multiple output (MIMO) transmission, the base station comprising:
   a transceiver configured to transmit and receive a signal; and
   a controller configured to control the transceiver to:
   transmit, to a plurality of terminals, a message configuring a first type interference measurement resource (IMR) for measuring interference between terminals within a coverage of the base station and a second type IMR for measuring interference from at least one neighbor base station,
   transmit, to the plurality of terminals, a signal based on the first type IMR and the second type IMR, and
   receive, from a terminal among the plurality of terminals, channel status information (CSI) generated based on the signal,
   wherein the interference between the terminals within the coverage of the base station is measured by removing a signal component of the terminal itself from the transmitted signal using the first type IMR, and
   wherein the interference between the terminals is measured by using an equation of $$\sum_{\substack{j \in C_i^k \\ j \neq M}} P_{i,j}^k \cdot w_{i,j}^k \cdot s_{i,j}^k = \sum_{j \in C_i^k} P_{i,j}^k \cdot w_{i,j}^k \cdot s_{i,j}^k - P_{i,M}^k \cdot w_{i,M}^k \cdot s_{i,M}^k,$$

where $$\sum_{j \in C_i^k} P_{i,j}^k \cdot w_{i,j}^k \cdot s_{i,j}^k$$

is the signal for the plurality of terminals $P_{i,j}^k$ is a transmission power which an i-th base station allocates to a j-th terminal in a k-th subframe $w_{i,j}^k$ is a precoding which the i-th base station applies to the j-th terminal in the k-th subframe, $s_{i,j}^k$ is a signal which the base station transmits to allow a terminal to measure interference, $C_i^k$ is a set of terminals to which the i-th base station or a transmission position allocates downlink resources in the k-th subframe, and $P_{i,M}^k \cdot w_{i,M}^k \cdot s_{i,M}^k$ is the removed signal component.

5. The base station of claim 4, wherein the base station is configured not to transmit the signal on the second type IMR to allow the terminal to measure the interference from the at least one neighbor base station.

6. The base station of claim 4, wherein the CSI includes interference information for terminals within a coverage of the base station except for the terminal.

7. A method of by a terminal, the method comprising:
   receiving, from a base station performing multiple input multiple output (MIMO) transmission, a message configuring a first type interference measurement resource (IMR) for measuring interference between terminals within a coverage of the base station and a second type IMR for measuring interference from at least one neighbor base station;
   receiving, from the base station, a signal based on the first type IMR and the second type IMR;
   transmitting, to the base station, channel status information (CSI) generated based on an interference measured from the signal,
   wherein the interference between the terminals within the coverage of the base station is measured by removing a signal component of the terminal itself from the transmitted signal using the first type IMR, and
   wherein the interference between the terminals is measured by using an equation of $$\sum_{\substack{j \in C_i^k \\ j \neq M}} P_{i,j}^k \cdot w_{i,j}^k \cdot s_{i,j}^k = \sum_{j \in C_i^k} P_{i,j}^k \cdot w_{i,j}^k \cdot s_{i,j}^k - P_{i,M}^k \cdot w_{i,M}^k \cdot s_{i,M}^k,$$

where $$\sum_{j \in C_i^k} P_{i,j}^k \cdot w_{i,j}^k \cdot s_{i,j}^k$$

is the signal for the plurality of terminals $P_{i,j}^k$ is a transmission power which an i-th base station allocates to a j-th terminal in a k-th subframe, $w_{i,j}^k$ is a precoding which the i-th base station applies to the j-th terminal in the k-th subframe, $s_{i,j}^k$ is a signal which the base station transmits to allow a terminal to measure interference, $C_i^k$ is a set of terminals to which the i-th base station or a transmission position allocates downlink resources in the k-th subframe, and $P_{i,M}^k \cdot w_{i,M}^k \cdot s_{i,M}^k$ is the removed signal component.

8. The method of claim 7, wherein the base station is configured not to transmit the signal on the second type IMR to allow the terminal to measure the interference from the at least one neighbor base station.

9. The method of claim 7, wherein the transmitting the CSI comprises generating the CSI by using a strength of the interference corresponding to a sum of a first interference and a second interference based on an equation of $I_{total} = \alpha \cdot I_A + I_B$, where $I_A$ is the first interference measured from the second type IMR, $I_B$ is the second interference measured from the first type IMR, $\alpha$ is a predetermined value.

10. The method of claim 7, wherein the CSI includes information on an interference from adjacent terminals within the coverage of the base station except for the terminal.

11. A terminal comprising:
a transceiver configured to transmit and receive a signal; and
a controller configured to control the transceiver to:
receive, from a base station performing multiple input multiple output (MIMO) transmission, a message configuring a first type interference measurement resource (IMR) for measuring interference between terminals within a coverage of a base station and a second type IMR for measuring interference from at least one neighbor base station,
receive, from the base station, a signal based on the first type IMR and the second type IMR, and
transmit, to the base station, channel status information (CSI) generated based on an interference measured from the signal,
wherein the interference between the terminals within the coverage of the base station is measured by removing a signal component of the terminal itself from the transmitted signal using the first type IMR, and
wherein the interference between the terminals is measured by using an equation of $$\sum_{\substack{j \in C_i^k \\ j \neq M}} P_{i,j}^k \cdot w_{i,j}^k \cdot s_{i,j}^k = \sum_{j \in C_i^k} P_{i,j}^k \cdot w_{i,j}^k \cdot s_{i,j}^k - P_{i,M}^k \cdot w_{i,M}^k \cdot s_{i,M}^k,$$

where $$\sum_{j \in C_i^k} P_{i,j}^k \cdot w_{i,j}^k \cdot s_{i,j}^k$$

is the signal for the plurality of terminals, $P_{i,j}^k$ is a transmission power which an i-th base station allocates to a j-th terminal in a k-th subframe, $w_{i,j}^k$ is a precoding which the i-th base station applies to the j-th terminal in the k-th subframe, $s_{i,j}^k$ is a signal which the base station transmits to allow a terminal to measure interference, $C_i^k$ is a set of terminals to which the i-th base station or a transmission position allocates downlink resources in the k-th subframe, and $P_{i,M}^k \cdot w_{i,M}^k \cdot s_{i,M}^k$ is the removed signal component.

12. The terminal of claim 11, wherein the base station is configured not to transmit the signal on the second type IMR to allow the terminal to measure the interference from the at least one neighbor base station.

13. The terminal of claim 11, wherein the controller is further configured to generate the CSI by using a strength of the interference corresponding to a sum of a first interference and a second interference based on an equation of $I_{total} = \alpha \cdot I_A + I_B$, where $I_A$ is the first interference measured from the second type IMR, $I_B$ is the second interference measured from the first type IMR, $\alpha$ is a predetermined value.

14. The terminal of claim 11, wherein the CSI includes information on an interference from adjacent terminals within the coverage of the base station except for the terminal.

* * * * *